United States Patent
Delacruz et al.

(10) Patent No.: US 11,157,670 B2
(45) Date of Patent: Oct. 26, 2021

(54) SYSTEMS AND METHODS FOR INTER-DIE BLOCK LEVEL DESIGN

(71) Applicant: Xcelsis Corporation, San Jose, CA (US)

(72) Inventors: Javier A Delacruz, San Jose, CA (US); Eric Nequist, Saratoga, CA (US); Jung Ko, San Jose, CA (US); Kenneth Duong, San Jose, CA (US)

(73) Assignee: Xcelsis Corporation, San Jose, CA (US)

(*) Notice: Subject to any disclaimer, the term of this patent is extended or adjusted under 35 U.S.C. 154(b) by 0 days.

(21) Appl. No.: 16/882,349

(22) Filed: May 22, 2020

(65) Prior Publication Data

US 2020/0356714 A1    Nov. 12, 2020

Related U.S. Application Data

(63) Continuation of application No. 16/016,347, filed on Jun. 22, 2018, now Pat. No. 10,664,564.

(51) Int. Cl.
| | | |
|---|---|---|
| *G06F 30/30* | (2020.01) | |
| *G06F 30/398* | (2020.01) | |
| *G06F 111/04* | (2020.01) | |
| *G06F 119/12* | (2020.01) | |

(52) U.S. Cl.
CPC ............ *G06F 30/30* (2020.01); *G06F 30/398* (2020.01); *G06F 2111/04* (2020.01); *G06F 2119/12* (2020.01)

(58) Field of Classification Search
USPC ....................................................... 716/102
See application file for complete search history.

(56) References Cited

U.S. PATENT DOCUMENTS

| | | | |
|---|---|---|---|
| 8,365,113 B1 * | 1/2013 | Bhardwaj | ............... G06F 30/30 716/106 |
| 2010/0306719 A1 | 12/2010 | Smayling | |
| 2014/0105246 A1 * | 4/2014 | Andreev | ................. G06F 1/206 374/178 |

* cited by examiner

*Primary Examiner* — Bryce M Aisaka
(74) *Attorney, Agent, or Firm* — Lerner, David, Littenberg, Krumholz & Mentlik, LLP

(57) ABSTRACT

An integrated circuit and a method for designing an IC where the smallest repeatable block is selected, designed and tested to span across multiple die levels. The block is configured to be timing closed at the block level thereby reducing the overall complexity of the design and avoiding the limiting effects of the constrained EDA tools. The block may subsequently be repeated on multiple die to be stacked in an IC.

18 Claims, 4 Drawing Sheets

SYSTEMS AND METHODS FOR INTER-DIE BLOCK LEVEL DESIGN

FIELD OF THE INVENTION

The following description relates to the design of microelectronic structures. More specifically it relates to the design of the block configuration relationship between bonded dies.

BACKGROUND

Microelectronics typically involve the use of thin semiconductor materials such as silicon wafers that may be formed into individual units or dies. Such elements are often used in integrated circuits (ICs) that may be subsequently installed onto printed circuit boards (PCBs). The field of Microelectronics has rapidly expanded over the last few decades with a demand for performance, greater storage or memory capacity and area reduction. Additionally, cost reduction is a continual concern that greatly influences the development of new microelectronic technologies and procedures. These demands on the industry have led to the increased complexity of the design of the ICs and other microscale structures.

A simple IC structure with very few components could be designed and configured manually. However, today the typical IC will consist of more than a billion transistors which generates a variety of complex problems to be resolved in placement to ensure the IC functions properly. These problems continue to increase in complexity and quantity as the demand for more storage, speed, and functionality increases. As such, these complex configurations have led to the development of a variety of rules which intern has developed into tools and other related software to help automate the process of design the microelectronic structures. The industry standard is the use of Electronic Design Automation (EDA) or use of computers to design and test the overall design and configuration of the IC. EDA tools often involve the use of software programs and large complex databases that aid in the design and configuration of the microelectronics.

The EDA tools have limitations on the size of databases that can be used. The size limitation on the EDA databases and development of multi-layer die structures may exceed the capabilities of the infrastructure of EDA users. For example, the complexity of a design will greatly increase when combining the principles of 3-D stacking because each level must function with the adjoining levels of the stack. The complexity of design and problem solving for manufacturing and testing can prove to be too much for an EDA database and users.

SUMMARY OF THE INVENTION

Systems and methods in accordance with many embodiments provide an integrated circuit having a plurality of individual die configured to be stacked and designed according to the block level design such that the blocks of the die have functional definitions that span at least two die in a stack of die.

Many embodiments are directed to an integrated circuit with a plurality of individual die configured to be stacked and a plurality of repeatable functional blocks, wherein the blocks are smaller functional subunits of an individual die and are designed using a process design kit such that they are timing closed at the block level and such that the plurality of blocks are configured to have a functional definition between at least any two of the plurality of individual die.

In other embodiments, the plurality of blocks spans more than one process design kit.

In still other embodiments, the plurality of repeatable functional sub-blocks are instantiated across each of the plurality of individual die configured to be stacked prior to the die being stacked.

In yet other embodiments, the plurality of repeatable functional blocks spanning more than one die are instantiated as an LEF/DEF.

In still yet other embodiments, the integrated circuit comprises at least two die configured to be stacked.

Numerous embodiments include a method for designing an integrated circuit at the block level. The circuit may be designed by determining a repeatable functional block of an integrated circuit and then selecting a process design kit suitable to design an individual functional block, followed by designing the repeatable functional block of the integrated circuit such that the design of the block is configured to be timing closed at the block level and wherein the repeatable block is configured to span across more than one die such that the block has functional definitions on each die. The designed blocks may then be tested at the block level to ensure timing closure has been met. Furthermore, the blocks may then be instantiated on a plurality of individual die, wherein the plurality of individual die that are configured to be stacked with at least another individual die having corresponding instantiated blocks.

In other embodiments, the integrated circuit comprises a plurality of electrical components configured to be timing closed at the block level and wherein the plurality of electrical components are further configured to occupy a functional definition on more than one die.

In still other embodiments, the functional block is instantiated across a plurality of individual die wherein the plurality of individual die are configured to be stacked in a multi-die configuration.

In yet other embodiments, the block is designed using a process design kit selected from a group consisting of multiple process design kits and a single process design kit.

In yet still other embodiments, the block is instantiated as an LEF/DEF

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which form a part of this disclosure.

BRIEF DESCRIPTION OF THE DRAWINGS

The description will be more fully understood with reference to the following figures, which are presented as various embodiments of the disclosure and should not be construed as a complete recitation of the scope of the disclosure, wherein.

DETAILED DESCRIPTION

An integrated circuit and methods to produce such in accordance with many embodiments is presented herein. In accordance with many embodiments the IC is designed by determining the smallest repeatable functional block and designing a multilayer IC that is timing closed at the block level. The block is designed according to many embodiments to have functional definitions across multiple die and subsequently be instantiated on an individual die to be later stacked according to the designed block.

The present disclosure may be understood by reference to the following detailed description, taken in conjunction with the drawings as described below. It is noted that, for purposes of illustrative clarity, certain elements in various drawings may not be drawn to scale.

Figure 1:
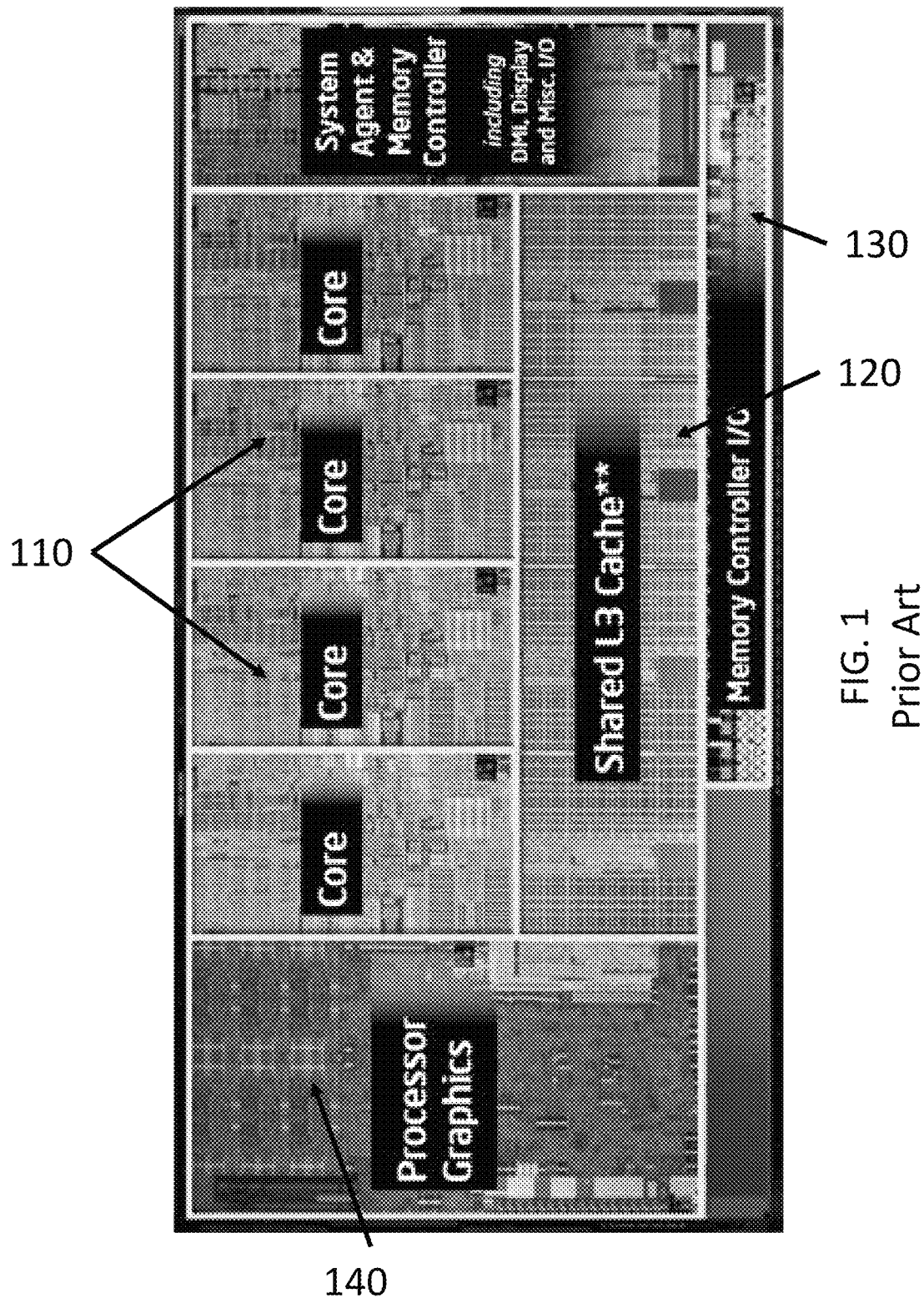
FIG. 1 illustrates an IC design according to current art

Integrated circuit design generally deals with the creation of electrical components and the design and placement of such components onto a platform such as a silicon wafer. The design and layout of the electrical components is performed in such a way as to create functional blocks designed to perform certain processes of the integrated circuit. For example, some blocks may be a complex layout comprising a core of a processor; others may serve as controllers such as memory or graphics controllers. In other examples, the blocks can be as simple as amplifiers or gain blocks that may serve as attenuators or amplifiers. The blocks may be considered the building blocks of an integrated circuit and each one is a carefully mapped out plan of transistors, resistors, capacitors and metallic interconnects forming the functional blocks of the IC design. FIG. 1 illustrates an example of an IC with various "blocks" depicted. For example, FIG. 1 illustrates an IC with various cores 110 as well as a memory controller block 130, a graphics controller 140, and a shared Level 3 (L3) cache 120 of the cores. These may be examples of higher level blocks involving a variety of smaller sub-blocks.

The overall IC and the individual blocks and sub-blocks may be designed using a Process Design Kit (PDK). A PDK is a set of design rules and guidelines specific to a foundry, foundry node, and foundry process flavor used to design, simulate and verify the design before the IC is entered into production. PDK's typically include a collection of files that designers of IC's can use along with other database tools for designing the IC. Any number of process design kits may be used in the design. Normally a designer may only require a single PDK for designing the IC.

Given the increased complexity of IC's and the ever increasing number of transistors in any given IC, the timing of the IC has to be carefully considered because the overall design of an integrated circuit is affected by timing constraints. In ICs. timing is generally related to the clock frequency or the speed at which an integrated circuit functions. Timing can be limited by the physical and electrical layout and design of the integrated circuit, and is designed to be optimized to meet the desired parameters of the circuit. For example, the processing parameters of a mobile phone are likely to be much greater than those in a simple remote control for a television. A typical design process is planned such that the timing is closed.

Timing is considered closed when the timing constraints and IC parameters have been satisfied through design optimization. In a typical design process, a die is designed to be timing closed at the block level in hierarchical designs or at die level in flat designs. Both of these are done for the same monolithis silicon die. As previously discussed, the increase in complexity of integrated circuit design increases the complex problems with respect to timing closure. Therefore, the complexity of meeting the timing constraints can be affected by the increased complexity of the overall IC with multiple die structures.

IC design involving the use of EDA tools and databases to design, layout and test the IC components before approval for manufacture involves the formation or design of block type elements similar to those discussed previously. Each block or sub-block designed in the IC layout is placed based on the overall function of the IC. For example, the IC displayed in FIG. 1 represents a complex IC design wherein more than a billion transistors are present. Thus, it can be seen that the overall design of an IC die can be complex.

The increased complexity of ICs and their designs have increased the strains on EDA systems proving current methods of design are not adequate to support the increasing complexity based on the ever changing demand.

For example, while the current databases and EDA tools may be capable of handling single die designs. The demand for increased speed and functionality is increasing the demand for more complex structures capable of handling the needs of the consumer. As a result, the database tools used in EDA can be quickly overwhelmed when planning a die to die stacking design. For example, turning to FIGS. 2 and 3, various method for designing the IC layout are presented.

Figure 2:
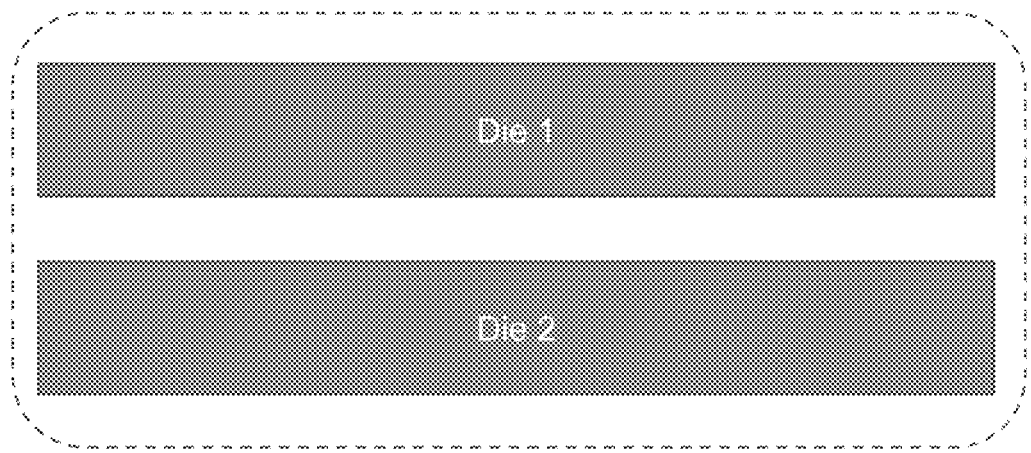
FIG. 2 illustrates an example of a multiple die design configuration.

FIG. 2 illustrates a design methodology where the design of two die are simultaneously planned and is represented by the dashed line surrounding both die. Such a methodology may overwhelm the database in EDA due to the complexity of ensuring that the stack now functions as a whole rather than as individual die. This is due to the increased complexity of ensuring that that each portion of one die will function with the corresponding portions of the remaining die. This is critical to ensure the overall design parameters are met for the IC as a whole.

Figure 3:
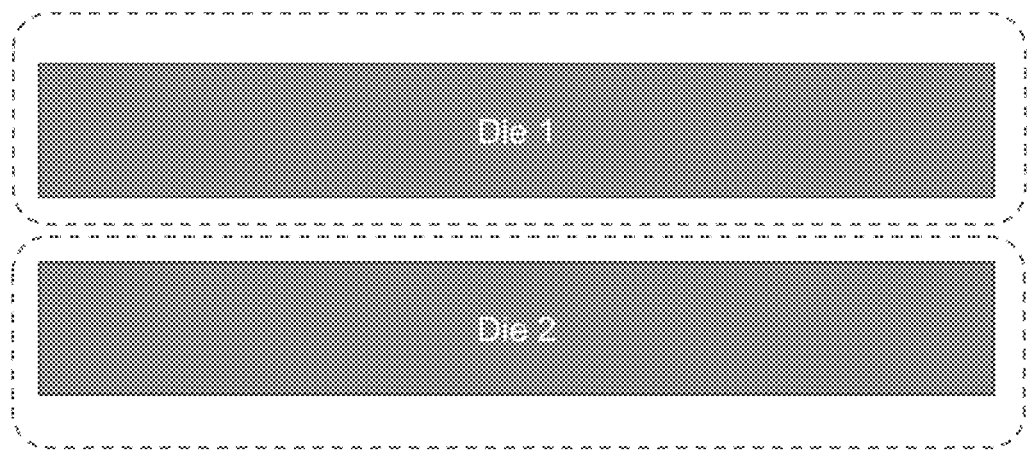
FIG. 3 illustrates an example of individual die design combination

Likewise, FIG. 3 illustrates another alternative wherein the individual die are designed separately then stacked. Such methods are more likely to experience problems between the stacked die functionality as each die would be designed separately, and integration of the two becomes highly complex. Furthermore, while such designs may function they will leave a lot of the benefit of 3-D stacking on the table. In other words, the benefits of 3-D stacking will be limited because the designs must be simpler and will not have the ultimate functionality.

Figure 4:
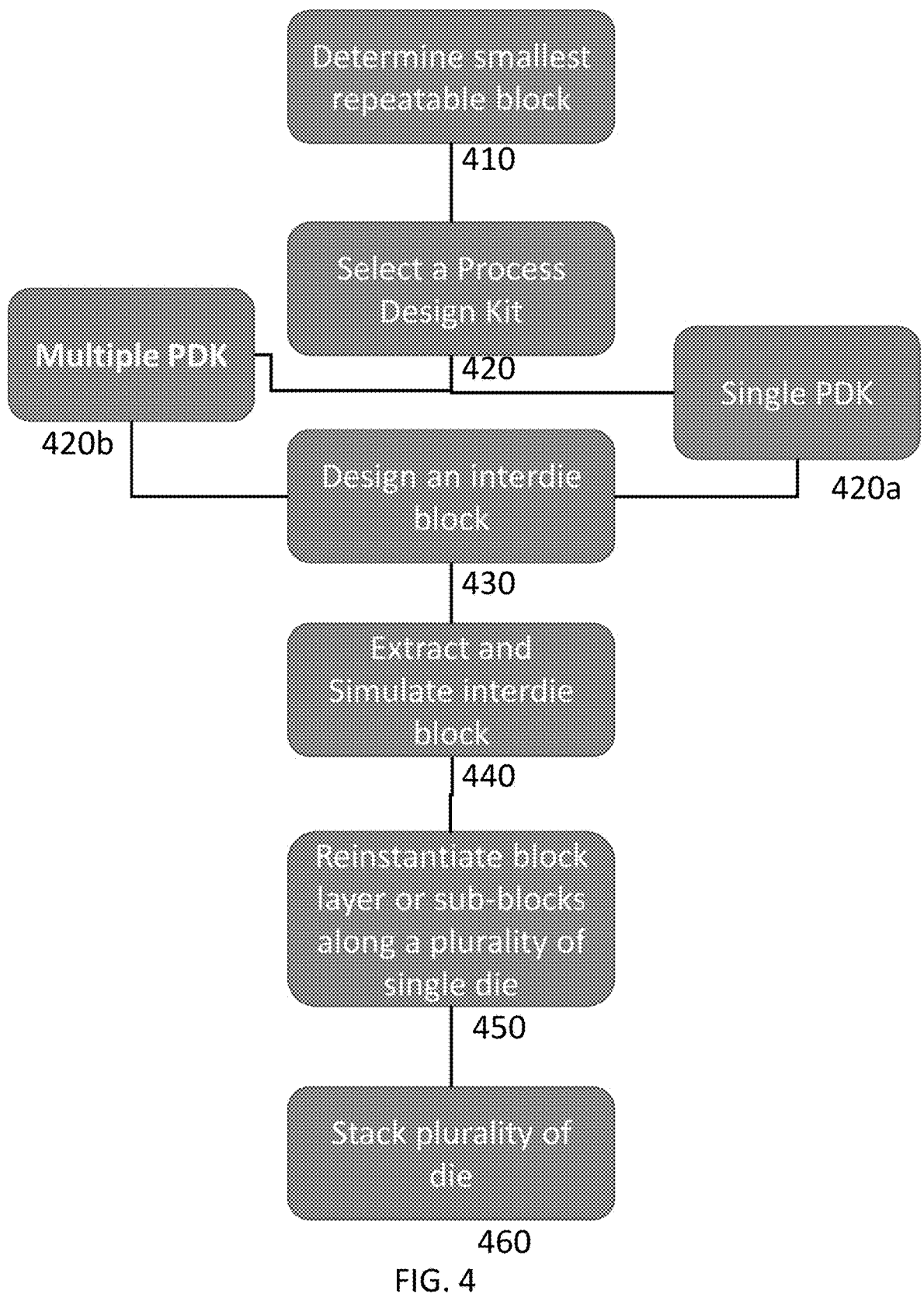
FIG. 4 illustrates a flowchart of a method for forming die stack in accordance with embodiments.
Figure 5A:
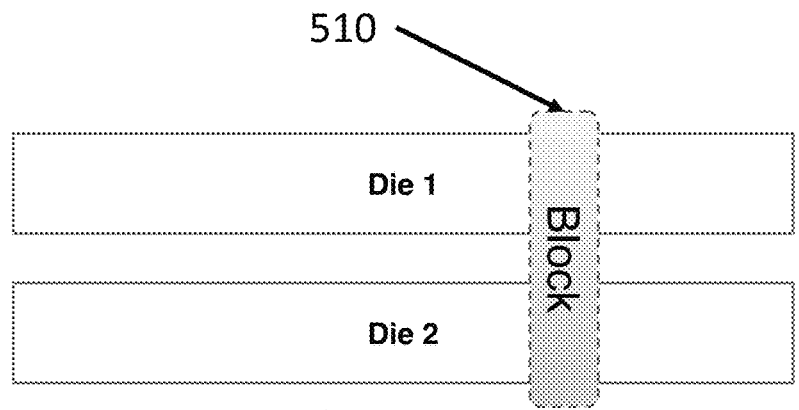
FIG. 5A illustrates an exemplary block level design for multiple die in accordance with embodiments.
Figure 5B:
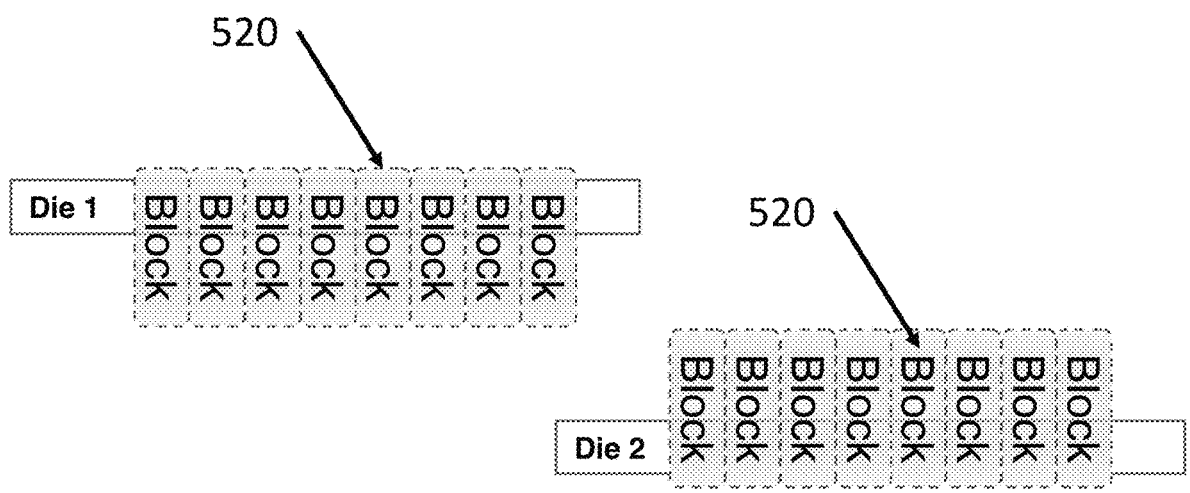
FIG. 5B illustrates an exemplary block level design for an individual die in accordance with embodiments.

In accordance with many embodiments an interdie stacking that is time closed at the block level is illustrated in FIGS. 4 to 5b. FIG. 4 illustrates a flow diagram of an exemplary embodiment for creating an IC that is time closed at the block level. FIGS. 5a and 5b are pictorial illustrations of the flow diagram according to many embodiments.

The schematic illustration of FIG. 4 summarizes an exemplary embodiment of a method of producing an interdie level stack configured at the block level. It is preferred in accordance with many embodiments the smallest repeatable block may be determined so that the planning may be simplified when dealing with multiple die configurations. The repeatable blocks may be determined based on the overall function of the IC and may be any number of blocks from a complex core or controller to a simple amplifier. The smallest or smaller repeatable block is determined first by understanding the overall function of the IC. The IC may be a multi core processor that may have various blocks including cores and processing units or memory caches. As the parameters and functions of the IC are determined it will become readily available to the designer what blocks are needed for the design and which ones may be the smallest or smaller repeatable blocks to be modeled across multiple die. Once the smallest repeatable block has been determined (step 410) for the desired IC it may be designed.

As previously discussed and in accordance with many embodiments the block(s) may be designed using a PDK. Selecting a PDK, step 420, may comprise a variety of PDKs selected from any on the known providers. Additionally, the blocks may be designed using a single PDK in conjunction with other EDA software and tools.

The design of the smallest repeatable block is preferable in accordance with many embodiments of the invention because it is designed to function and be timing closed at the block level across multiple die rather than at the die level. For example, step 430 in FIG. 4 illustrates the designing of a repeatable block that may have definitions or defined functions across multiple die. The design of a single repeatable block across multiple die simplifies the design process because only the block needs to be timing closed across the die vs the entire die. Thus as multiple blocks may be designed in accordance with some embodiments the end result would be a multiple die stack that is timing closed and meets the desired parameters of the manufacture.

Once the block has been designed to be timing closed at the block level across a plurality of die, the designed block can be repeated across the individual die to be used in the stack. In other words, step 440 of FIG. 4 illustrates the next step in the process by instantiating the designed repeatable block across a plurality of individual die that are designed to be stacked within the IC. The instantiating of the blocks eventually forms the desired pattern of the IC, but does so in such a manner that multiple die may be stacked together and be timing closed without being limited by the constraints of the EDA tools.

In accordance with many embodiments as the blocks and sub-blocks are designed to be timing closed at the block level, the overall IC stack of dies may be configurd to be timing closed at the die level as well. For example, in some embodiments a backside bias may be added to one of the die thereby enabling timing closure between the die configured with the designed blocks or sub-blocks. Additionally, at least one of the die configured to be stacked may be configured to have the bulk of the die biased to allow for easier timing closure between die.

The final step in the process in accordance with many embodiments and as indicated in FIG. 4, may be the stacking of individual die to create a multiple die stack having an interdie block-level design configuration that has been timing closed at the block level.

Turning now to FIGS. 5a and 5b exemplary embodiments of the invention are illustrated in a graphical form of the previously discussed flow diagram of FIG. 4. FIG. 5a illustrates the selection of the smallest repeatable block 410 that may be designed across a plurality of die such that it is timing closed across more than one die.

The designed repeatable interdie blocks 510 as previously described throughout the specification may serve a variety of functions within the IC on the die, including, but not limited to, processor to memory, partial processor to partial processor, memory to memory, or partial series to partial series. In many embodiments multiple blocks may serve the same function. A key embodiment involves selecting the smallest repeatable block of the IC that serves the same or similar function.

Referring back to the flow diagram of FIG. 4 in relation to FIG. 5a, the selection, design and testing (steps 410-440) of the smallest repeatable block may correspond to graphical representation of FIG. 5a, wherein the block 510 is selected, designed and tested to be timing closed between a plurality of die. It should be noted that the die represented in FIG. 5a illustrate the die to be stacked and are not necessarily representative of actual die and actual blocks but represent the design process of the block over the die.

The process represented in FIG. 5a, in accordance with many embodiments may include the use of multiple PDKs or a single PDK. Such embodiments require a smaller database for problems solving and EDA designing because it is done at the block level rather than at the die level. FIG. 5a represents the process by which a block may be designed to be used in an IC rather than the actual fabrication of a block for an IC. However, in some embodiments the block may be designed and manufactured on an IC so that physical testing of the block may be performed to determine the efficacy of the design. Although a specific layout and graphical representation is illustrated it should be understood that a number of methods for testing may be used.

In accordance with many embodiments the selected blocks 510 may be designed across die levels in a stacked die configuration as illustrated in FIG. 5a. In accordance with many embodiments the selected blocks 510 are timing closed at the block level rather than the die level. Time closing at the block level vs the die level improves the efficiency of EDA by reducing the size and complexity of the EDA tools and databases used.

Once the selected block has been designed and tested to be time closed and span across multiple die levels the block can be broken down into smaller sub-blocks 520 illustrated in FIG. 5b and instantiated on an individual die that is designed to be stacked. In other words, once the design of the block has been established that design can be repeated across an individual die such that the die may be configured to stack with a corresponding die with corresponding designed blocks. An exemplary embodiment of the instantiation of designed blocks is illustrated in FIG. 5b.

As previously discussed and in accordance with many embodiments the designed block may be instantiated on a plurality of individual die as a simplified LEF/DEF keeping in mind that the designed block 510 has definitions on a plurality of die. Such sub-blocks 520, according to many embodiments, can then be reinstantiated across the individual die as illustrated in FIG. 4B. Thus, the overall design and timing closure is simplified to the block level designed to cross die boundaries and allow for increased complex stacking die designs to be used without the limiting effects of the EDA tools.

DOCTRINE OF EQUIVALENTS

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. An integrated circuit comprising:
a plurality of individual die configured to be stacked; and
a plurality of repeatable blocks,
wherein the plurality of repeatable blocks are timing closed at the block level or die level and are configured to have a defined function across multiple die, and
wherein when the plurality of individual die are stacked, a first portion of each of the plurality of individual die will function with a corresponding second portion of each of the remaining plurality of individual die.

2. The integrated circuit of claim 1, wherein the plurality of repeatable blocks are smaller functional subunits of an individual die.

3. The integrated circuit of claim 1, wherein the plurality of repeatable blocks are instantiated across each of the multiple die configured to be stacked prior to the die being stacked.

4. The integrated circuit of claim 3, wherein the plurality of repeatable blocks spanning more than one die are instantiated as an Library Exchange Format/Design Exchange Format (LEF/DEF).

5. The integrated circuit of claim 1, wherein each of the plurality of repeatable blocks has a defined function on each of the multiple die between which each of the plurality of repeatable blocks extends.

6. The integrated circuit of claim 1, wherein one of the multiple die includes a backside bias to enable timing closure between the one of the multiple die and the repeatable block.

7. The integrated circuit of claim 1, wherein at least one of the multiple die is configured to be stacked, and
wherein the at least one of the multiple die is configured to have a bulk of the at least one of the multiple die biased to allow for timing closure between the multiple die.

8. A method for designing an integrated circuit comprising:
determining, based on a function of the integrated circuit, a repeatable block having at least one defined function across multiple die;
configuring the repeatable block to be timing closed at block level or die level across at least any two of a plurality of individual die;
instantiating the repeatable block across the plurality of individual die, wherein the plurality of individual die are configured to be stacked within the integrated circuit; and
stacking two or more of the plurality of die to form a multiple die stack.

9. The method of claim 8, wherein the multiple die stack includes an interdie block-level design configuration that is timing closed at the block level.

10. The method of claim 8, wherein the repeatable block spanning multiple die is instantiated as a Library Exchange Format/Design Exchange Format (LEF/DEF).

11. The method of claim 8, further comprising selecting a process design kit suitable to design the repeatable block.

12. The method of claim 8, wherein when the plurality of individual die are stacked, a first portion of each of the plurality of individual die will function with a corresponding second portion of each of the remaining plurality of individual die.

13. A repeatable block of an integrated circuit configured to be timing closed at the block level or die level,
wherein the repeatable block is further configured to have a defined function across multiple die, and
wherein when the multiple die are stacked, a first portion of each of the multiple die will function with a corresponding second portion of each of the remaining multiple die.

14. The repeatable block of claim 13, wherein the repeatable block is instantiated across a plurality of individual die, and
wherein the plurality of individual die are configured to be stacked in a multi-die configuration.

15. The repeatable block of claim 13, wherein the repeatable block is designed using either multiple process design kits or a single process design kit.

16. The repeatable block of claim 14, wherein the repeatable block is instantiated as a Library Exchange Format/Design Exchange Format (LEF/DEF).

17. The repeatable block of claim 13, further comprising a plurality of electronic components,
wherein each of the plurality of electrical components has a defined function on each the multiple die between which each of the plurality of repeatable functional blocks extends.

18. The repeatable block of claim 13, wherein when the plurality of individual die are stacked, a first portion of each of the plurality of individual die will function with a corresponding second portion of each of the remaining plurality of individual die.

* * * * *